United States Patent
Culver et al.

(10) Patent No.: US 6,298,129 B1
(45) Date of Patent: Oct. 2, 2001

(54) TELECONFERENCE RECORDING AND PLAYBACK SYSTEM AND ASSOCIATED METHOD

(75) Inventors: Timothy L. Culver, Mesquite; Randall S. Oakes, Rowlett, both of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/038,296

(22) Filed: Mar. 11, 1998

(51) Int. Cl.[7] .............................. H04M 3/42; H04M 11/00
(52) U.S. Cl. ............................................. 379/202; 379/204
(58) Field of Search .................................... 379/202, 203, 379/204, 205, 206, 93.21; 348/14.06, 14.08, 14.09

(56) References Cited

U.S. PATENT DOCUMENTS

| | | | |
|---|---|---|---|
| 5,375,068 | 12/1994 | Palmer et al. | 364/514 |
| 5,546,324 | 8/1996 | Palmer et al. | 364/514 |
| 5,559,876 * | 9/1996 | Alperovich | 379/205 |
| 5,608,653 | 3/1997 | Palmer et al. | 364/514 |
| 5,623,690 | 4/1997 | Palmer et al. | 395/806 |
| 5,668,863 * | 9/1997 | Bieselin et al. | 379/202 |
| 5,922,045 * | 7/1999 | Hanson | 709/206 |
| 6,091,808 * | 7/2000 | Wood et al. | 379/201 |

* cited by examiner

*Primary Examiner*—Ahmad Matar
*Assistant Examiner*—Hector Agdeppa

(57) ABSTRACT

A teleconference recording and marking system for use by a plurality of teleconference participants includes a plurality of telephones with each having a mechanism for transmitting a voice signal and a marking signal. A mechanism is provided for establishing a communications link between the telephones. Another mechanism is used for recording the audible voice signals and marking signals transmitted from the telephones in a digital data stream. Also included is a mechanism for determining a plurality of time offsets with each time offset measured from a known location in the data stream to each marking signal. A storage mechanism is included for storing the data stream and time offsets. Lastly, a player mechanism is provided for playing the data stream starting at any one of the time offsets. The system combines the use of telecommunication and computer networks in order to allow teleconferences to be recorded and marked and later retrieved and played.

23 Claims, 5 Drawing Sheets

```
<HEAD>
<TITLE>Weekly Staff Meeting</TITLE>
</HEAD>

<BODY>
<IMG SRC="/icons/bullet.gif">
<A HREF="/cgi-bin/teleconplay.pl?telecon=mtg02041998.ra%offset=0:00:00">Weekly Staff Meeting: Agenda</A>
<BR>
<IMG SRC="/icons/bullet.gif">
<A HREF="/cgi-bin/teleconplay.pl?telecon=mtg02041998.ra%offset=0:03:11">Schedule Overview</A>
<BR>
<IMG SRC="/icons/bullet.gif">
<A HREF="/cgi-bin/teleconplay.pl?telecon=mtg02041998.ra%offset=0:07:13">Bill's Remarks</A>
<BR>
<IMG SRC="/icons/bullet.gif">
<A HREF="/cgi-bin/teleconplay.pl?telecon=mtg02041998.ra%offset=0:13:10">Jill's Remarks</A>
<BR>
<IMG SRC="/icons/bullet.gif">
<A HREF="/cgi-bin/teleconplay.pl?telecon=mtg02041998.ra%offset=0:16:52">Sue's Remarks</A>
<BR>
<IMG SRC="/icons/bullet.gif">
<A HREF="/cgi-bin/teleconplay.pl?telecon=mtg02041998.ra%offset=0:22:07">Discussion/Action Items</A>
<BR>
</BODY>
```

FIG. 5

TELECONFERENCE RECORDING AND PLAYBACK SYSTEM AND ASSOCIATED METHOD

FIELD OF THE INVENTION

The present invention relates to teleconference recording systems and more particularly pertains to a teleconference recording system and method that allows a teleconference participant to set an identifying mark when a teleconference is being recorded and to later play back a portion of this recorded teleconference beginning at the mark. The system of the present invention combines the use of telecommunication and Internet web-based tools and equipment to perform its intended function. As a result, a teleconference can be recorded and marked using a touch tone telephone, and the teleconference recording or portions thereof can be readily archived, retrieved, and played from the desktop using a conventional multimedia computer.

DESCRIPTION OF THE PRIOR ART

The use of teleconference systems have evolved from simple telephone applications to those that employ computer multimedia workstations communicating in sophisticated networked applications. By way of example, U.S. Pat. No. 5,375,068, U.S. Pat. No. 5,546,324, and U.S. Pat. No. 5,608,653 disclose a video teleconferencing system for networked and computerized workstations. In this system, an audio and video transmission mechanism is used for sending near real-time and continuous audio and video data streams from a local workstation to a remote workstation by a digital data network. The transmission mechanisms are synchronized such that the audio and video data signals can be reconstructed without affecting continuity of the teleconference at the remote workstation. The system relies upon the execution of a master process on a local workstation that subsequently causes execution of a slave process on a remote work station for receiving audio and video data. Reconstruction of the data is performed by the remote workstation inserting each frame of video data into the audio data stream sent by the local workstation to thereby prevent loss of continuity of data during a system overload condition.

In addition, U.S. Pat. No. 5,623,690 discloses an audio/video storage and retrieval mechanism for multimedia work stations that interleaves audio and video data in a data file. The system includes a storage mechanism for a workstation to store audio and video data as digital data packets in a data file and a retrieval mechanism for the workstation to retrieve audio and video data from the data file. The video data is presented as an image on the display of the workstation and the audio data is sent to either amplified speakers or headphones. The audio data is stored as a data file such that it can be retrieved and reconstructed into a continuous audio signal. The video data is stored to the data file such that each frame of video data is inserted into the audio data stream without effecting the continuity of the audio signal reconstructed by the work station. Timing information is attached to each frame of video data stored to the file and indicates a point in the continuous audio data stream which corresponds in time to the frame of video data. A synchronizer displays a frame of video data when the point in the audio data stream, corresponding to the timing information of the retrieved video frame is audibly reproduced by the workstation.

Although the aforementioned systems describe ways to synchronously stream and store audio and video data in order to reconstruct a conference session, they do not describe or employ facilities that would assist a user in readily accessing and playing back user-selected portions of a teleconference. Consequently, although teleconference recordings are frequently recorded and archived, they are seldom be used due to the lack of effective access to the recorded information at particular points.

SUMMARY OF THE INVENTION

The present invention implements a new architecture and method for managing teleconferences. The system of the present invention substantially departs from the described prior art by providing a teleconference recording and marking system and associated method that allows a teleconference participant to set an identifying mark when a teleconference is being recorded and to later play back a portion of this recorded teleconference beginning at the mark.

The system combines the use of a telephone network and an Internet or intranet computer network to perform its function.

The system allows for selected points in a teleconference to be marked for later access through the use of a conventional end-user touch tone telephone.

The system enables whole teleconference recordings or portions thereof to be readily archived, retrieved, and played from the desktop using a conventional multimedia computer and associated software.

The system includes, in combination, a plurality of telephones. Each telephone has facilities for transmitting a voice signal and a plurality of marking signals for marking a teleconference. The system provides a mechanism for establishing a wireline and/or wireless communications link between the telephones. A recording mechanism is included for recording the audible voice signals and marking signals that are transmitted from the telephones in a digital data stream. A mechanism is also provided for replacing each marking signal within the data stream with a shorter time tag. Computational facilities are included for determining a time offset measured from the beginning of the data stream to each time tag. A storage device is provided for storing the data stream and the time offsets. Lastly, a player mechanism is included for playing the data stream starting at any one of the time offsets.

BRIEF DESCRIPTION OF THE DRAWINGS

FIG. 5 shows the underlying web page source document that is contained within the left frame of the web browser of FIG. 4 and that allows activation of a sound player for playing a portion of a teleconference starting at a particular time offset.

DESCRIPTION OF THE PREFERRED EMBODIMENT

Figure 1:
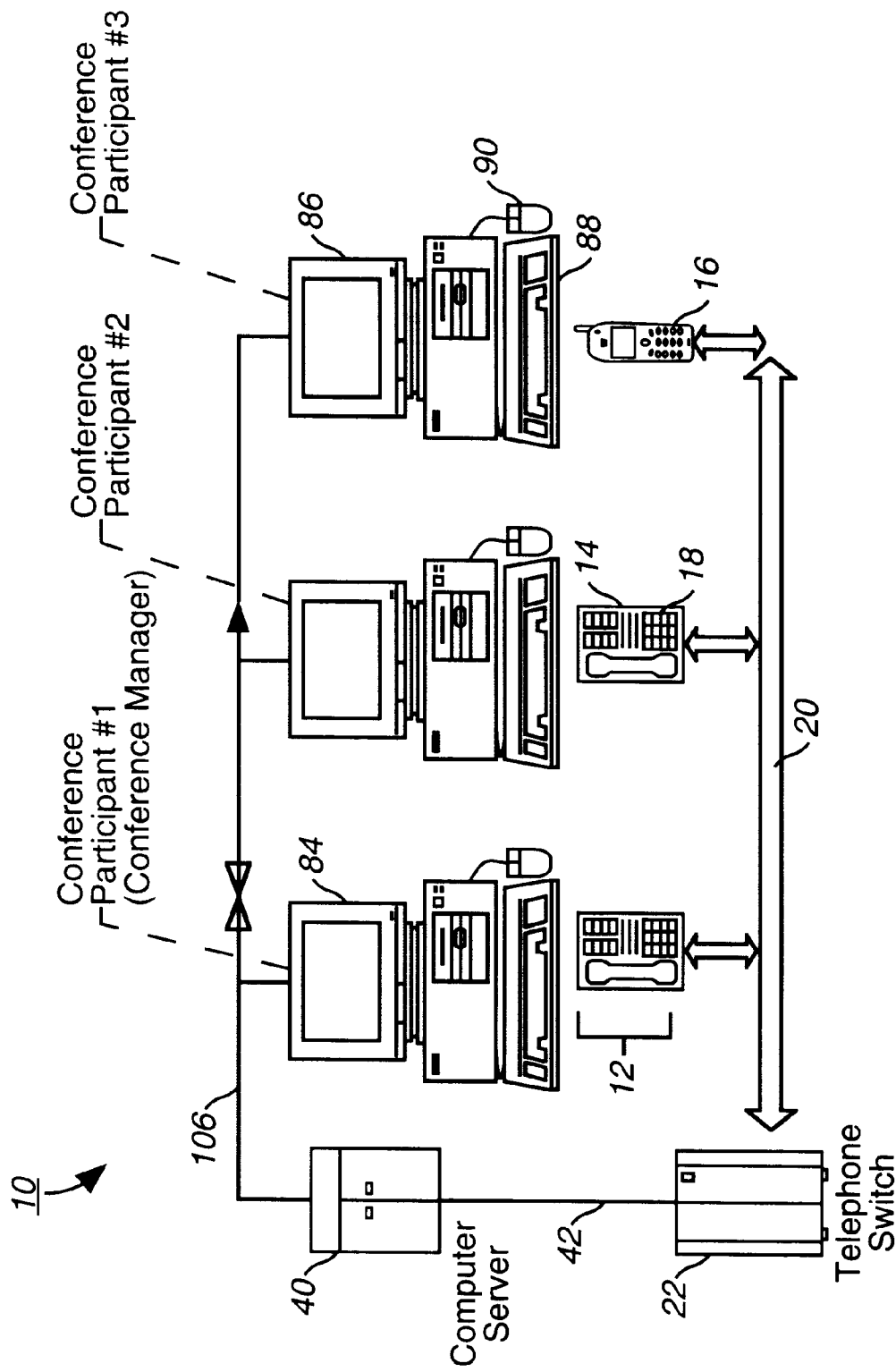
FIG. 1 is a pictorial representation of the system of the present invention with each participant having a telephone for taking part in a teleconference to be recorded and a multimedia computer for playing back all or part of the teleconference after it is recorded. The conference manager has the capability to mark the teleconference through use of a touch tone telephone. The other conference participants have the capability to mark the teleconference through the use of a multimedia computer.

The system of the present invention is shown in FIG. 1 and is designated by reference number 10. The system allows for conference participants to set identifying marks by telephone when a teleconference is being recorded and to also later play back a portion of this recorded teleconference with multimedia computers. Specifically, the system 10 includes one or more touch tone telephones 12 for use by a plurality of conference participants, with one participant acting as a conference manager. The telephones used during a teleconference can be of a wireline type 14, a wireless type 16, or combination thereof. Other comparable equipment such as multimedia computer-based "Internet phones" can also be used. Each telephone of the system 10 has the capability for transmitting an audible voice signal from a conference participant. Each telephone can also generate and send a marking signal when an unillustrated conference participant manually activates an alphanumeric key 18 on the keypad of the telephone. The marking signal generated is a conventional audible dual tone multi-frequency (DTMF) signal.

A communications link 20 is established between the telephones. The associated routing and connecting infrastructure used for establishing the communications link can include conventional wire line and wireless telecommunications equipment and facilities that physically connect the telephones of the conference participants through at least one telephone switch 22. The communications link is readily established through use of preexisting routing and connecting networks such as an internal private branch exchange (PBX) telephone network or with the telephone networks of local and long distance telephone companies.

Figure 2:
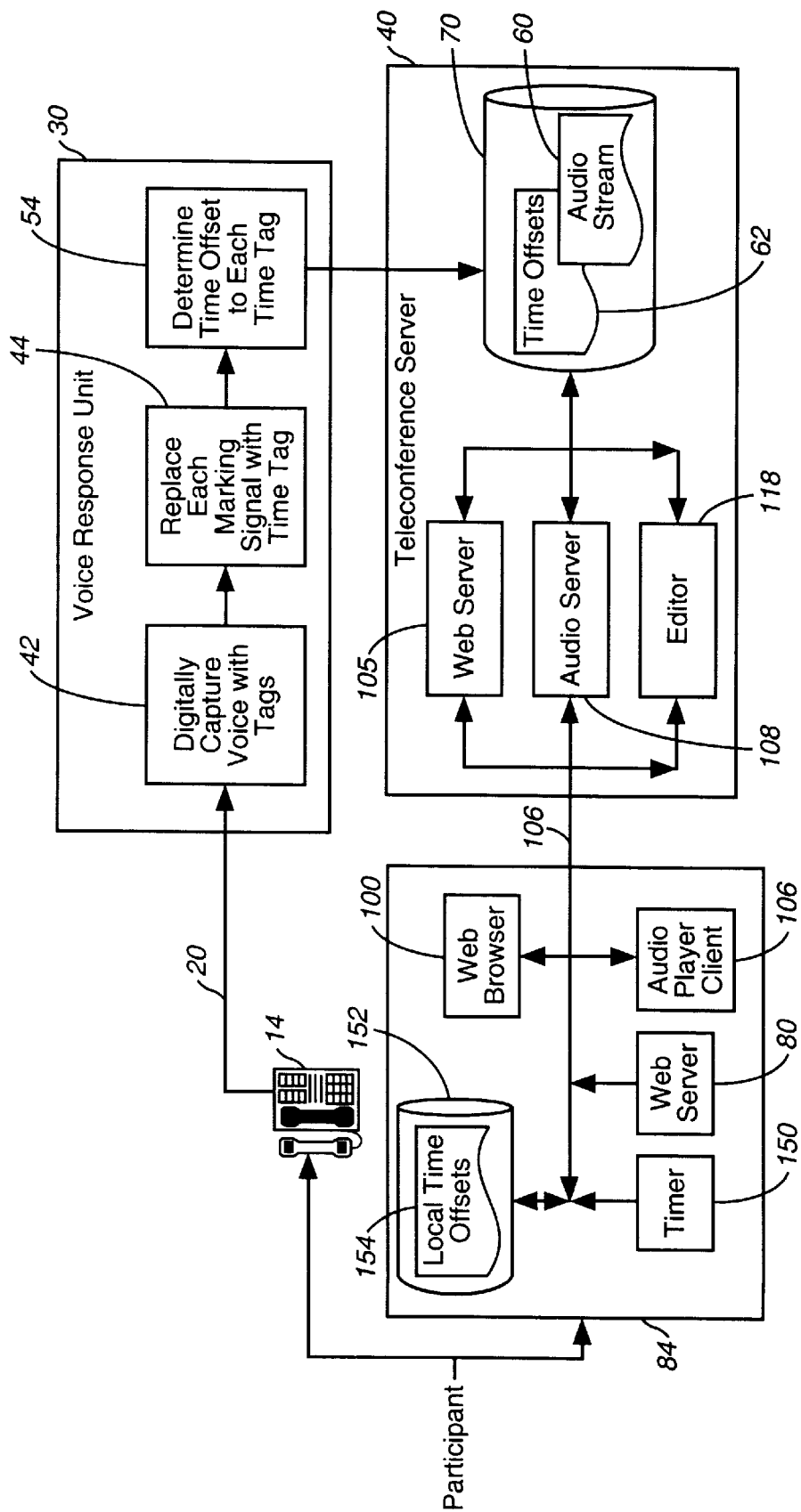
FIG. 2 is a pictorial representation showing the required processing and data flow for implementing the system.
Figure 3A:
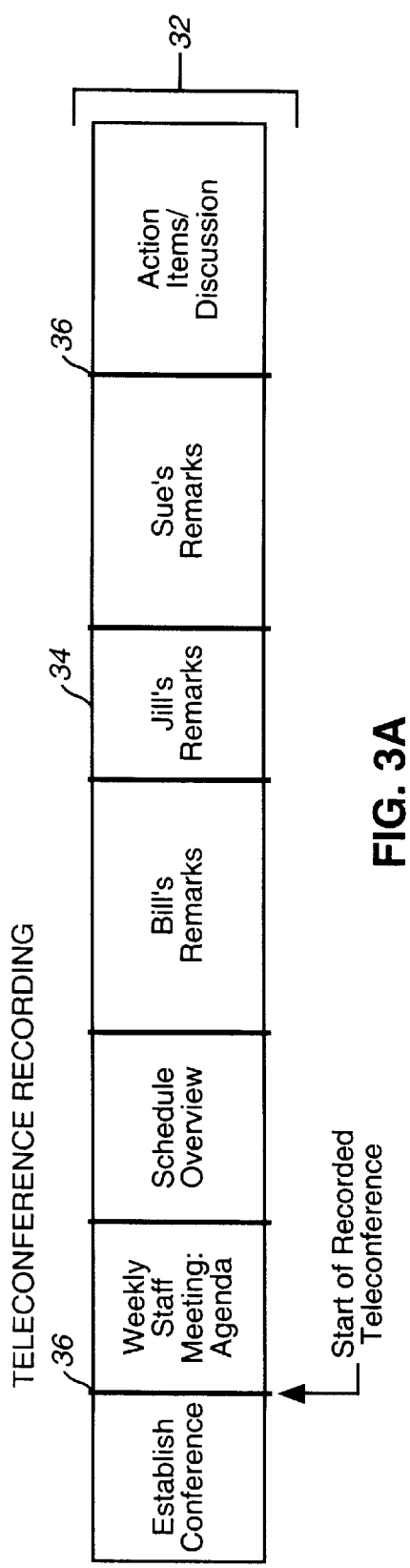
FIG. 3A illustrates the format of a recorded teleconference with various sessions separated by marking signals that are sent by the conference manager through use of a touch tone telephone.

Referring now to FIG. 2, the system 10 also includes an electronic recording mechanism or voice response unit 30. The voice response unit 30 is connected to the communications link 20 and is used for recording the audible voice signals and marking signals transmitted from the telephones by the conference participants. The voice response unit converts the audible signals into a digital data stream 32 as shown in FIG. 3A. The digital data stream is thus comprised of a multitude of voice segments 34 separated by marking signal segments 36. Each voice segment 34 can include the recorded voice of aL plurality of conference participants. Both the voice signals and marking signals are recorded as discreet data samples. As such, the voice signal samples represent varying time-dependent data values, while the marking signal samples of each marking signal segment 36 represent nearly the same data value, due to the fact that a single DTMF tone was sent by telephone 12 when key 18 was depressed. Referring again to FIGS. 1 and 2, the voice response unit 30 preferably resides and executes on a processor of a separate computer server 40, which is connected to the switch 22 through an interfacing communications link 42. Alternatively, the voice response unit may be constructed as stand-lone piece of equipment.

Figure 3B:
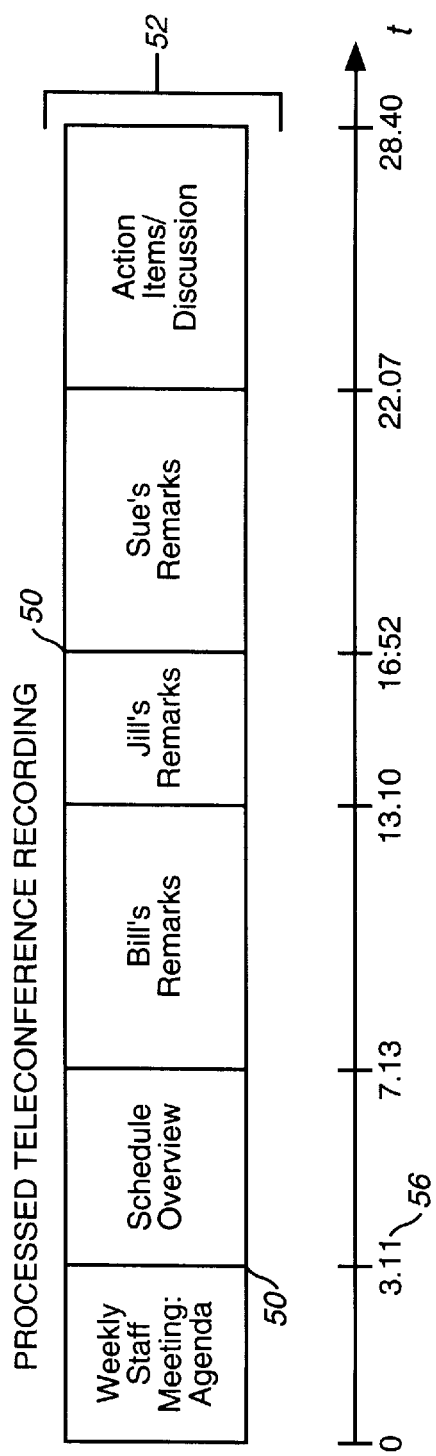
FIG. 3B illustrates the format of a processed teleconference digital recording with various sessions separated by time tags, which allow time offsets to be measured starting from the commencement of a teleconference.

Referring now to FIGS. 2 and 3A, when the voice response unit 30 executes on server 40, several key applications or processes are accomplished. The voice response unit executes a first application 42 that digitally captures the audible voice and marking signals in the digital data'stream 32. Next, a second application 44 is executed and replaces each long marking signal segment 36 within the digital data stream 32 with a shorter discreet time tag 50. The once audible digital data samples of each marking signal segment 36, which represent the marking signal sent via telephone are removed and replaced with the inaudible time tag 50. Any DTMF tone generated as the result of depressing key 18 for a prolonged period of time is thus effectively removed from the digital data stream 32, thereby precluding a user from having to listen to the tone during play back. The resulting data stream of the processed teleconference recording 52 as shown in FIG. 3B is thus of shorter duration than the original data stream 32. Lastly, the voice response unit 30 executes a third application 54 that calculates a time offset 56 that is preferably measured from the beginning of the data stream 52 to each time tag 50. These three server-initiated applications can be executed either on a sequential or parallel fashion on the data stream 32 and in either a non-real time or real-time fashion as the voice and marking signals arrive over the communications link 20. In an alternative embodiment, the processed teleconference recording 52 could be split at each time tag into a plurality of smaller portions based on teleconference duration or upon request of the conference manager.

Referring again to FIG. 2, the processed teleconference recording 52 is preferably saved in an audio file 60 that is formatted to be played by a conventional computer-resident audio player. The time offsets 56 are saved in computer data file, preferably a hypertext markup language (HTML) compliant web page source document 62 that can be displayed by a conventional web browser client application. The audio file 60 and the web page source document 62 are then stored on a hard disk 70 or other suitable storage medium of server 40.

Lastly, the system 10 includes a playing mechanism for playing the data stream 52 contained in the audio file 60 starting at any one of the time offsets 56 contained in the web page source document 62. The playing mechanism comprises several applications or processes that execute on the server 40 and the multimedia computers 84 of the conference participants. As shown in FIG. 1, each multimedia computer 84 of the system 10 is of a conventional type that includes a monitor 86, keyboard 88, and input pointing device such as a mouse 90, and unillustrated sound board and associated speakers.

Figure 4:
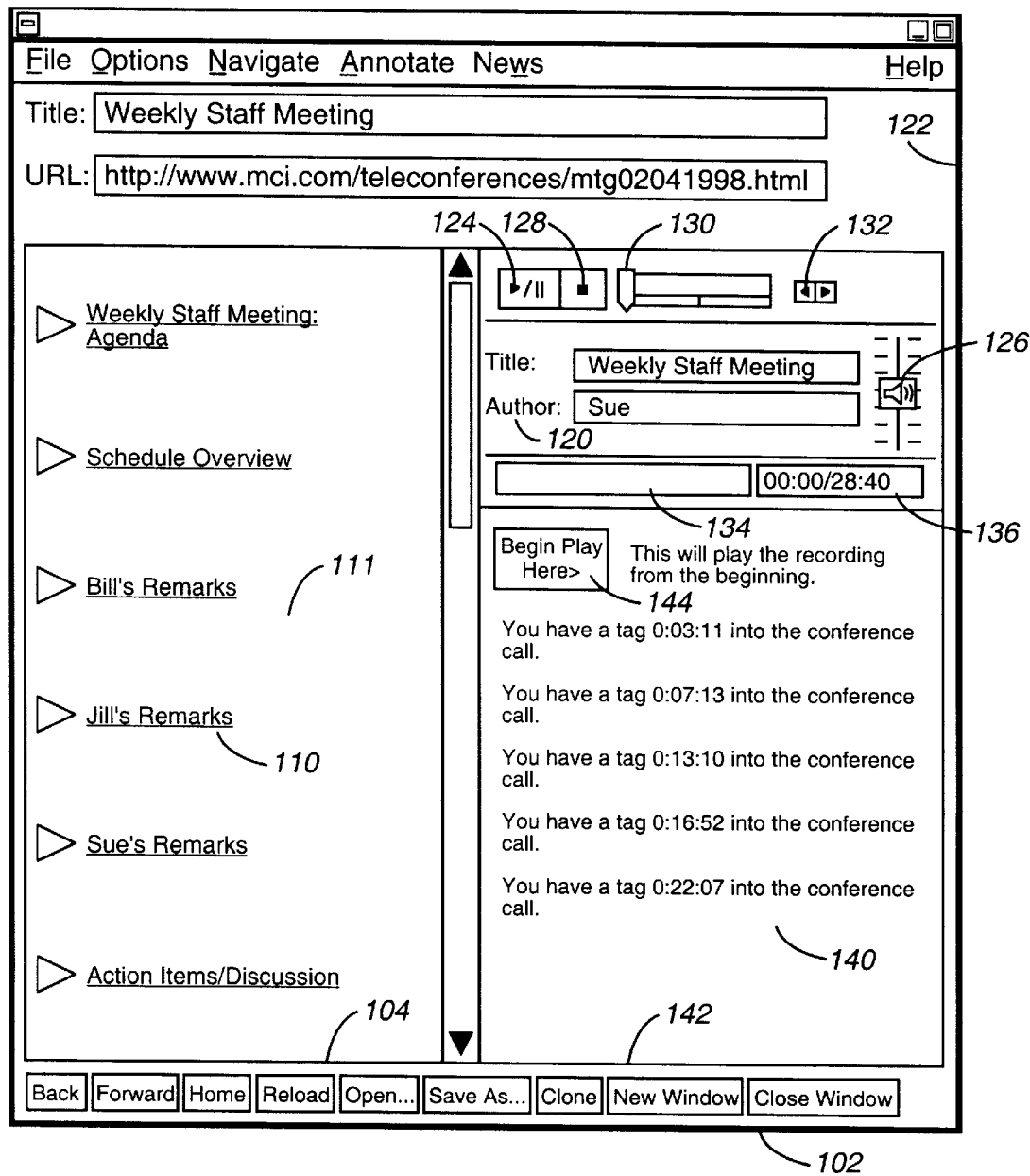
FIG. 4 shows a graphical user interface of a web browser for controlling playback of a teleconference session and allowing access into the recorded teleconference at selected time offsets.

Referring to FIGS. 2 and 4, a web browser client application 100 such as the Internet Explorer by Microsoft Corporation executes on computer 84 and has a user interface 102 for displaying the web page source document 62 in a scrollable frame 104. A web server application 105 such as the Apache Server executes upon server 40 and supplies the web page source document 62 to the web browser client application through an Internet or intranet communications link 107, which connects the server 40 to the computers 84. In addition, an audio player client application 107 such as the ReadAudio Player by RealNetworks executes upon computer 84 for playing the audio file 60 starting at any one of the time offsets 56. An audio server application 108 such as the RealServer by RealNetworks executes upon server 40 for supplying the audio file to the audio client application.

The audio client application 107 is activated by a conference participant through one of a plurality of hypertext links 110 of the web page source document 62. The web page source document is displayed as an activation listing 111 on the web browser client user interface 102. The hypertext links provide pointers to designated points in a teleconference, allowing a user to skip directly to a given point, and also facilitate ready selection of specific information from a potentially large pool of teleconferences. As shown in FIG. 5, each hypertext link 110 can activate an interface application 112 to the audio player client 107. The parameters which are provided include, as a minimum, the file name 114 of the audio file 60 and the associated time offset location 56 from which to begin playing the audio file. In this instance, activation of the playing application on computer 84 is accomplished through the use of the conventional Common Gateway Interface (CGI) on a local web server application 80, as shown in FIG. 2. Note, however, that activation of the playing application can be accomplished through a variety of conventional programming constructs, including VBX or ActiveX controls. Upon activation of a hypertext link, the recorded teleconference is played starting at a given time offset through the speaker system of computer 84.

When the web page source document 62 is initially constructed by the voice response unit 30, a hypertext link label 116 for each hypertext link is created and filled with a default label. The default link labels may be replaced with descriptive information about the recording. For example, after the web page source document 62 is created and stored on disk 70 of server 40, each default link label 116 can be modified by the conference manager to reflect the actual content of that portion of the teleconference to which it relates through use of a conventional web page editor 118 such as FrontPage by Microsoft Corporation. The server 40 could include file protection features to ensure that only a conference manager could edit the content of the web page source document 62 or audio file 60.

In order to facilitate usability when playing a teleconference, several other user controls are included. Referring to FIG. 4, a control panel 120 is displayed on the user interface 102 within frame 122 for controlling the audio player client application 107. The control panel includes a play button 124 for initiating the playing of an audio file 60, a volume control button 126 for controlling the volume of play, and a stop button 128 for stopping play. The control panel also shows the title and author of the teleconference. The control panel includes a moveable slider bar 130 that allows the audio file to be played beginning at one of the time offsets when the slider bar is manually moved to a designated location through use of slider control switches 132. Lastly, the status of teleconference play is shown by a first gauge 134 that indicates the length of elapsed play and a second gauge 136 that shows the actual time of play and the total time length of the teleconference.

In addition, a conference status listing 140 is displayed on the user interface 102 within frame 142. The status listing lists all of the designated time offsets within the particular teleconference. A user could then access a desired time offset by moving the slider bar 130 to the appropriate location with the slider control switches 132. The status listing also provides a depressible control button 144 that allows the recorded teleconference to be played from its starting point when pressed.

During operation of the system 10, a teleconference is controlled by a conference manager with a plurality of individuals serving as conference participants, as shown in FIG. 1. All participants would first establish a communications conference among themselves, which is depicted in FIG. 3A. The conference manager would then initiate the teleconference by sending a first keying signal 36, as shown in FIG. 3A, and would also control the subsequent sending of marking signals during various points of the teleconference. All other conference participants would be directed by the conference manager to not send marking signals from their telephones. In an alternative embodiment, an appropriate security scheme could be implemented as part of the voice response unit 30 to ensure that no marking signals sent by the other teleconference participants would be recognized.

At certain points during the teleconference, the conference manager depresses key 18 to send a marking signal to be recorded, thus delineating selected portions of the teleconference. The teleconference is digitally recorded, and time offsets to each time tag or the beginning of each marking signal segment 36 are determined. The corresponding audio file 60 and web page source document 62 with blank labels 116 are generated by the voice response unit. At a later time, the conference manager would edit the link labels 116 with editor 118 to reflect the actual content of the various portions of the teleconference. In an alternate embodiment, the conference manager could use the alphanumeric keys on the telephone or computer to enter an applicable heading when recording the teleconference. Both the time offsets now contained in the web page source document 62 and the applicable audio file 60 are stored on the server 40 and available use over the Internet or a local intranet.

Furthermore, the system provides a logging mechanism that allows a conference participant other than the conference manager to save local time offsets into the teleconference session. To realize this capability, a timer application 150 as shown in FIG. 2 is provided and executes on each computer 84. Upon initiation by the conference manager of the first marking signal 36 of the teleconference, a conference participant would activate the timer application 150 by manually depressing a key on keyboard 88 or mouse 90 of computer 84. In an alterative embodiment, the timer application of the system 10 is automatically activated by the telephone switch 22 sending a signal to each computer 84 through communications links 42 and 107 upon the request of the conference manager.

The conference participants may now generate local keying signals during the teleconference through use of keyboard 88 or mouse 90. Each computer 84 then calculates a local time offset as measured from the initial activation of the timer application to each participant-generated keying signal. These time offsets are then stored locally on a disk 152 or other suitable storage medium of computer 84 as data file, preferably an HTML-compliant web page source document 154 that is formatted in much the same fashion as web page source document 62. Now, the conference participant can display the web page source document 154 with web browser client application 100 and begin playing the data stream 60 starting at any one of the local time offsets by activating an associated hypertext link. Thus, even though the conference manager would control the generation of time offsets into the teleconference on a global basis, an individual conference participant could also generate time offsets into the teleconference for use on a local basis.

As an alternative, the timer application 150 of the system may be incorporated into a more expansive client application that allows a participant to keep textual notes or obtain updates to new teleconferences through the server 40 through use of conventional Internet "push" delivery technology. The server 40 of the system 10 could also provide the capability to send each participant a message to confirm that a teleconference was recorded and is now available for use. A multi-level security scheme may also be set up to provide controlled access to the stored recordings and time offsets on server 40 and computers 84. Lastly, the system could incorporate the use of a conventional search engine application executing either on server 40 or computer 84 to allow searching of teleconference data.

What is claimed is:

1. A teleconference recording and marking system for use by a plurality of teleconference participants comprising:
   means for establishing a communications link between a plurality of telephones each capable of transmitting marking signals in addition to audible voice signals;
   means for recording the audible voice signals and the marking signals transmitted from the telephones in a digital data stream;
   means for determining a plurality of time offsets with each measured from a known location in the data stream to each marking signal; and
   means for storing the data stream and time offsets.

2. A teleconference recording and marking system as set forth in claim 1 and further comprising a plurality of telephones each having means for transmitting a voice signal and a plurality of marking signals.

3. A teleconference recording and marking system as set forth in claim 1 and further comprising means for playing the data stream starting at any one of the time offsets.

4. A teleconference recording and marking system as set forth in claim 1 and further comprising means for replacing each marking signal within the digital data stream with a shorter time tag.

5. The teleconference recording and marking system as set forth in claim 1 and further comprising a plurality of telephones each having means for transmitting a voice signal and a plurality of marking signals and wherein the marking signals are audible dual-tone multi-frequency signals.

6. The teleconference recording and marking system as set forth in claim 1 and further comprising a plurality of telephones each having means for transmitting a voice signal and a plurality of marking signals and wherein the telephones include those of a wireline type.

7. The teleconference recording and marking system as set forth in claim 1 and further comprising a plurality of telephones each having means for transmitting a voice signal and a plurality of marking signals and wherein the telephones include those of a wireless type.

8. The teleconference recording and marking system as set forth in claim 1 wherein the means for storing stores the digital data stream in an audio file.

9. The teleconference recording and marking system as set forth in claim 1 wherein the means for storing stores the time offsets in a web page source document.

10. The teleconference recording and marking system as set forth in claim 1:
    wherein the means for storing stores the digital data stream in an audio file; and
    wherein the means for playing includes an audio client application for playing the audio file starting at any one of the time offsets.

11. The teleconference recording and marking system as set forth in claim 1:
    wherein the means for storing stores the digital data stream in an audio file;
    wherein the means for playing includes an audio client application for playing the audio file starting at any one of the time offsets and an audio server application for supplying the audio file to the audio client application.

12. The teleconference recording and marking system as set forth in claim 1:
    wherein the means for storing stores the time offsets in a web page source document; and
    wherein the means for playing further comprises a web browser client application with a user interface for displaying the web page source document.

13. The teleconference recording and marking system as set forth in claim 1:
    wherein the means for storing stores the time offsets in a web page source document; and
    wherein the means for playing further comprises a web browser client application having a user interface for displaying the web page source document and a web server application for supplying the web page source document to the web browser client application.

14. The teleconference recording and marking system as set forth in claim 1 wherein the communications link is established through the use of at least one switch.

15. The teleconference recording and marking system as set forth in claim 1 and further comprising a multimedia computer having:
    means for activating a timer application upon command of one of the participants at the start of a teleconference;
    means for generating a plurality of keying signals with generated each upon command of one of the participants during the teleconference;
    means for determining a plurality of local time offsets with each determined from the activation of the timer application to the generation each keying signal;
    means for storing the local time offset; and
    means for playing the data stream starting at any one of the local time offsets.

16. A method for recording and marking a teleconference comprising the steps of:
    providing a plurality of telephones each having means for transmitting an audible voice signal and a manually-activated marking signal;
    establishing a communications link between the telephones;
    recording the audible voice signals and marking signals transmitted from the telephones in a digital data stream;
    determining a time offset from a known location in the data stream to each marking signal; and
    storing the data stream and time offsets.

17. The method for recording and marking a teleconference as set forth in claim 16 and further comprising the step of playing the data stream starting at any one of the time offsets.

18. The method for recording and marking a teleconference as set forth in claim 16 and further comprising the steps of:
    providing a multimedia computer;
    activating a timer application on the computer upon command at the start of a teleconference;
    generating a plurality of keying signals, each generated by the computer upon manual command during the teleconference;
    determining a local time offset on the computer as measured from the activation of the timer application to receipt of each keying signal;
    storing the local time offsets on the computer; and
    playing the data stream on the computer starting at any one of the local time offsets.

19. A teleconference recording and marking system for use by a plurality of teleconference participants for allowing a participant to set an identifying time tag when a teleconference is being recorded and to later play back a portion of this recorded teleconference beginning at the time tag comprising:

a plurality of touch tone telephones each having means for transmitting an audible voice signal and a plurality of manually-activated audible dual tone multi-frequency marking signals;

means for establishing a communications link between the telephones;

means for recording the audible voice signals and marking signals transmitted from the telephones in a digital data stream;

means for replacing each marking signal within the data stream with a shorter time tag;

means for determining a time offset measured from the beginning of the data stream to each time tag;

means for storing the data stream in an audio file and the time offsets in a web page source document; and means for playing the data stream contained in the audio file starting at any one of the time offsets contained in the web page source document, wherein the means for playing further comprises a web browser client application having a user interface for displaying the web page source document, a web server application for supplying the web page source document to the web browser client application, an audio client application for playing the audio file starting at any one of the time offsets when activated by one of the participants through the web page source document, and an audio server application for supplying the audio file to the audio client application.

20. The teleconference recording and marking system as set forth in claim 19 wherein the audio client application is activated by one of the participants through one of a plurality of hypertext links included on the web page source document.

21. The teleconference recording and marking system as set forth in claim 19:

wherein the audio client application includes a user interface that is displayed by the web browser client; and wherein the user interface of the audio client application includes means for manually controlling play of the audio file beginning at any one of the time offsets.

22. The teleconference recording and marking system as set forth in claim 19 wherein the time offsets are displayed on the user interface of the web browser client application.

23. A method for recording and marking a teleconference as recited in claim 15 further comprising:

replacing each marking signal within the digital data stream with a shorter time tag.

* * * * *